UNITED STATES PATENT OFFICE.

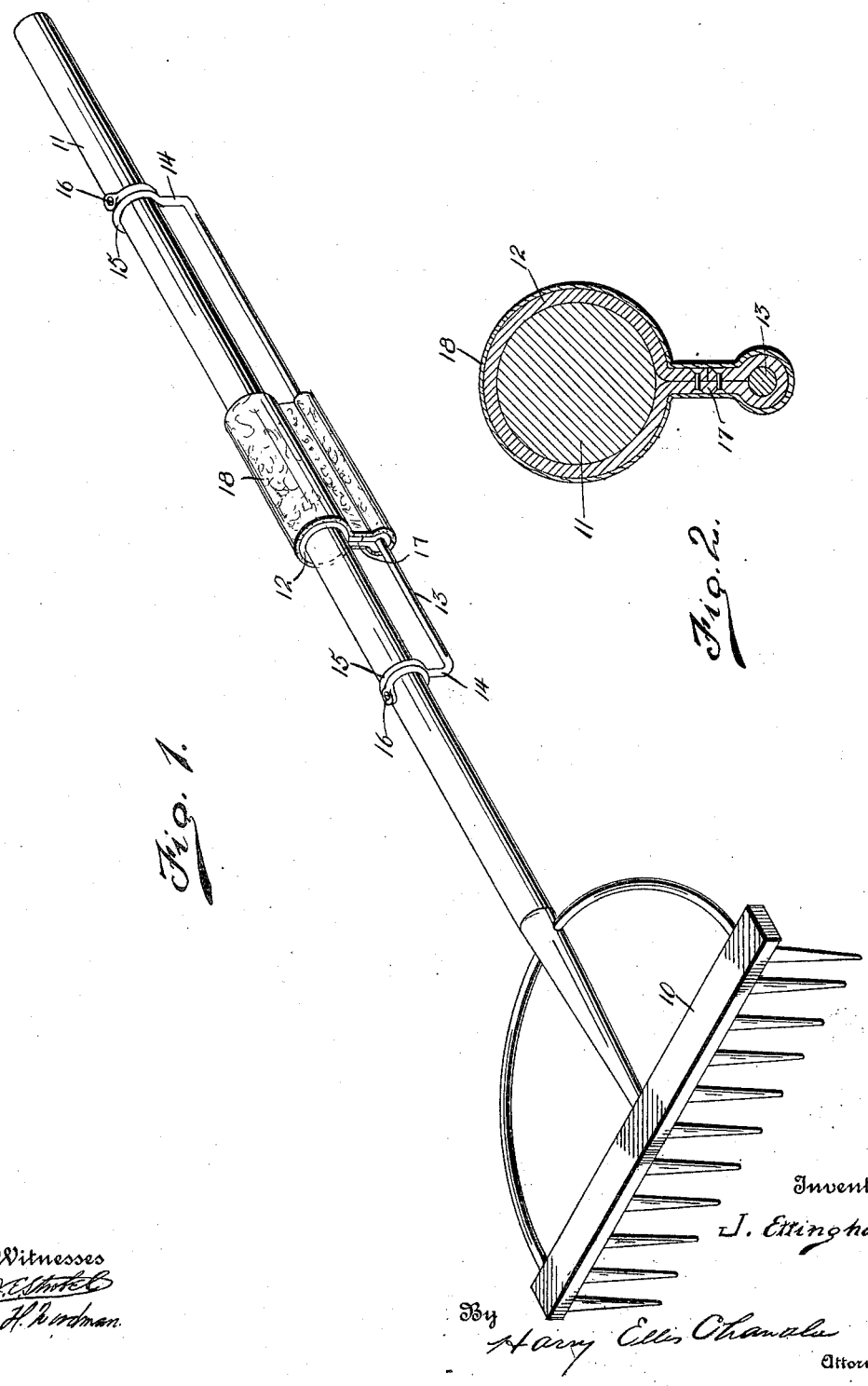

JOHN ETTINGHAUS, OF LAKEWOOD, NEW JERSEY.

RAKE ATTACHMENT.

1,032,535.  Specification of Letters Patent.  Patented July 16, 1912.

Application filed January 27, 1912. Serial No. 673,857.

*To all whom it may concern:*

Be it known that I, JOHN ETTINGHAUS, a citizen of the United States, residing at Lakewood, in the county of Ocean and State of New Jersey, have invented certain new and useful Improvements in Rake Attachments, of which the following is a specification.

My invention relates to new and useful improvements in rakes and more especially to handles thereof and the object of my invention is to provide a rake handle having a slidable sleeve adapted to be graspd by one hand of the operator while the rake handle is moved back and forth through the sleeve by the other hand.

A further object of my invention is to provide a guide for this sleeve which will both prevent casual disengagement of the sleeve from the handle and the turning of the sleeve upon the handle.

With these and other objects in view, my invention will be more fully described, illustrated in the accompanying drawings which show a preferred embodiment of my device and then specifically pointed out in the claims which are attached to and form a part of this application.

In the drawings, Figure 1 is a perspective view of a conventional form of handle provided with my improved device. Fig. 2 is a transverse section taken through the slidable sleeve.

Referring more specifically to the drawings, in which similar reference numerals designate corresponding parts throughout, 10 designates the head of a conventional hand rake having a handle 11 upon which is slidably mounted a sleeve 12 said sleeve being mounted both upon the handle and upon a guide 13. The guide 13 consists of a piece of relatively heavy wire extended in parallel spaced relation to the handle and below the same and having its end portions upturned as at 14 and coiled about the handle as at 15, said coils being secured against all movement by screws 16 or other suitable fastening means. The slidable sleeve is preferably formed from a single piece of sheet metal bent to fit loosely about the handle and guide with its free edges bearing together beneath the guide, the portions of the strip upon either side between the handle and guide being bent inwardly as at 17 and secured by rivets or other suitable means. This sleeve is preferably covered with leather or other suitable material 18 to form a comfortable hand grip.

In operation the rake is employed in the customary manner, the sleeve being grasped by the operator with one hand and the rake being moved back and forth with the other hand, the sleeve remaining stationary while the handle is moved through the same.

It will of course be understood that minor changes in details such as may be found necessary to adapt the device upon handles other than rake handles may be made if desired, without in the slightest degree departing from the spirit of my invention.

What I claim is:—

1. The combination with an implement handle, of a sleeve slidable upon said handle and adapted to serve as a hand grip, and means for holding said sleeve against rotation upon the handle, said means also preventing the handle becoming disengaged from the sleeve.

2. The combination with an implement handle, of a sleeve slidable upon said handle and adapted to serve as a hand grip, and a guide for said sleeve carried by said handle.

3. The combination with an implement handle, of a guide carried by said handle and comprising a piece of wire extending in parallel spaced relation to the handle and having its ends coiled about the handle and secured thereto, a sleeve slidable upon said handle and guide said sleeve being formed from a single piece of sheet metal bent about the handle and guide with its free edges bearing against each other and with its side portions bent inwardly to engage against each other between the handle and guide, said inbent side portions being secured together.

In testimony whereof I affix my signature, in the presence of two witnesses.

JOHN ETTINGHAUS.

Witnesses:
JOSEPHINE MATTHEWS,
ERNEST E. LE COMPTE.

Copies of this patent may be obtained for five cents each, by addressing the "Commissioner of Patents, Washington, D. C."